K. B. MOORE AND H. R. EDMANDS.
PROCESS OF AND APPARATUS FOR PRECIPITATING AND RECOVERING PRECIOUS METALS FROM THEIR SOLUTIONS.
APPLICATION FILED SEPT. 21, 1917.
1,368,520.
Patented Feb. 15, 1921.
4 SHEETS—SHEET 1.
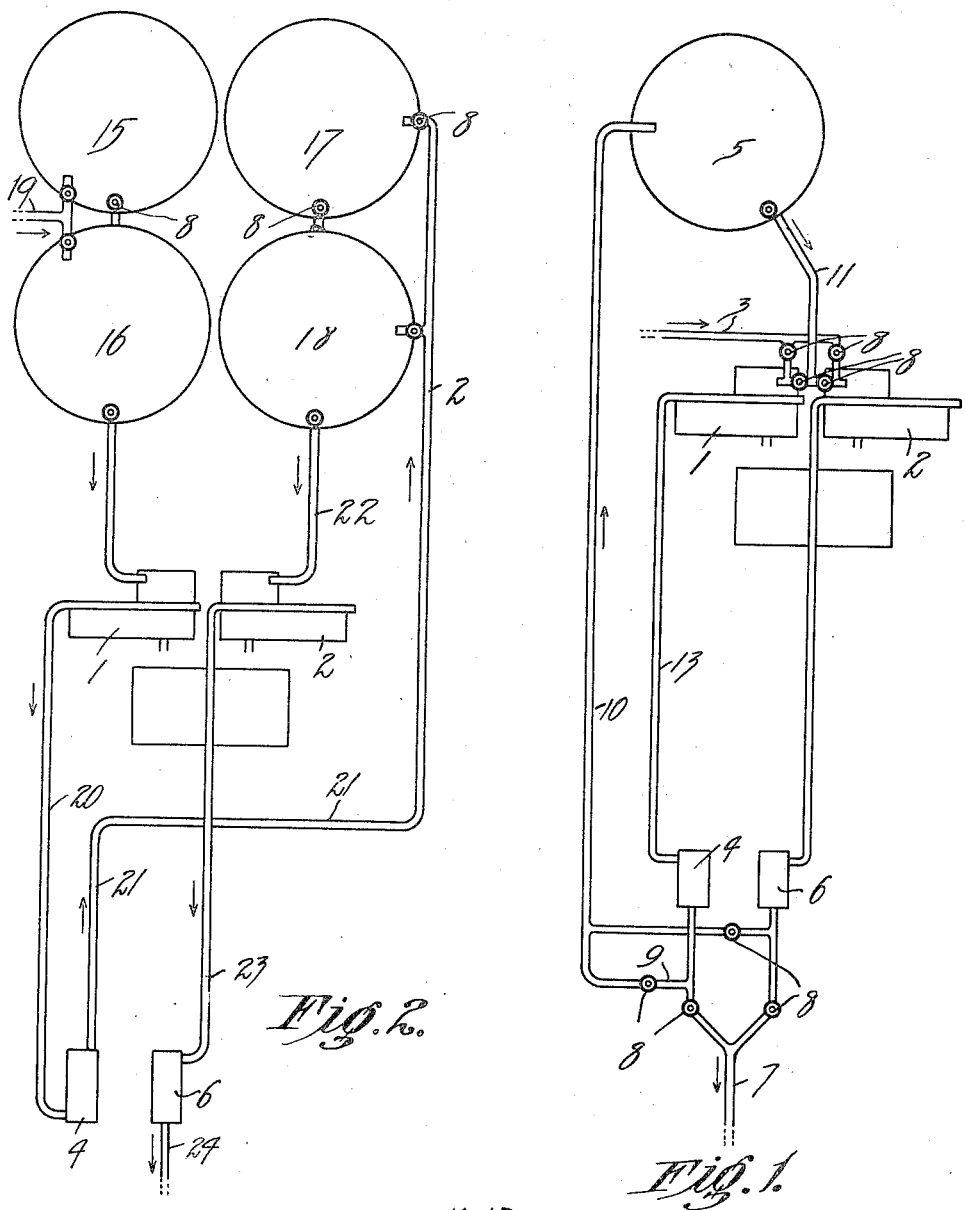
Karl Byron Moore & Herbert Richard Edmands
Inventors
by
Lawrence Langner
Attorney

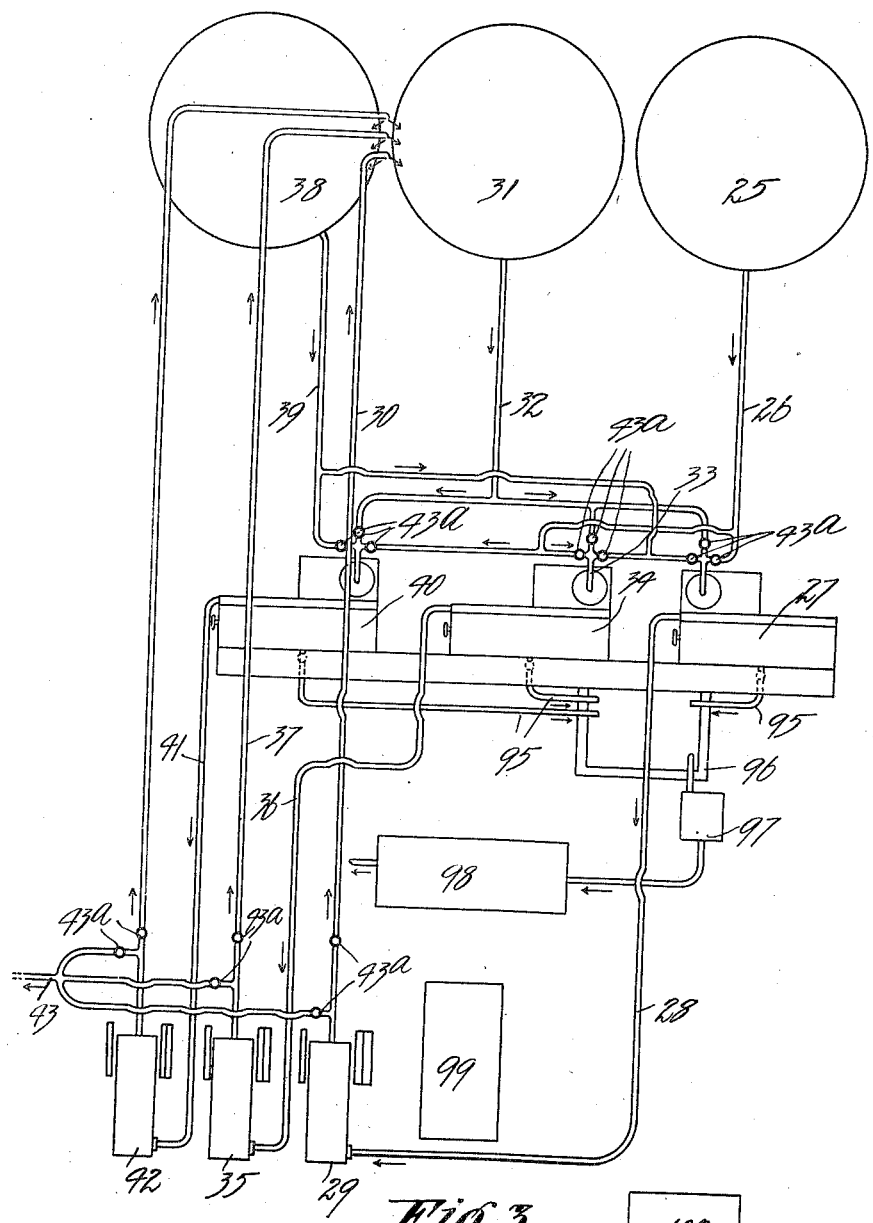

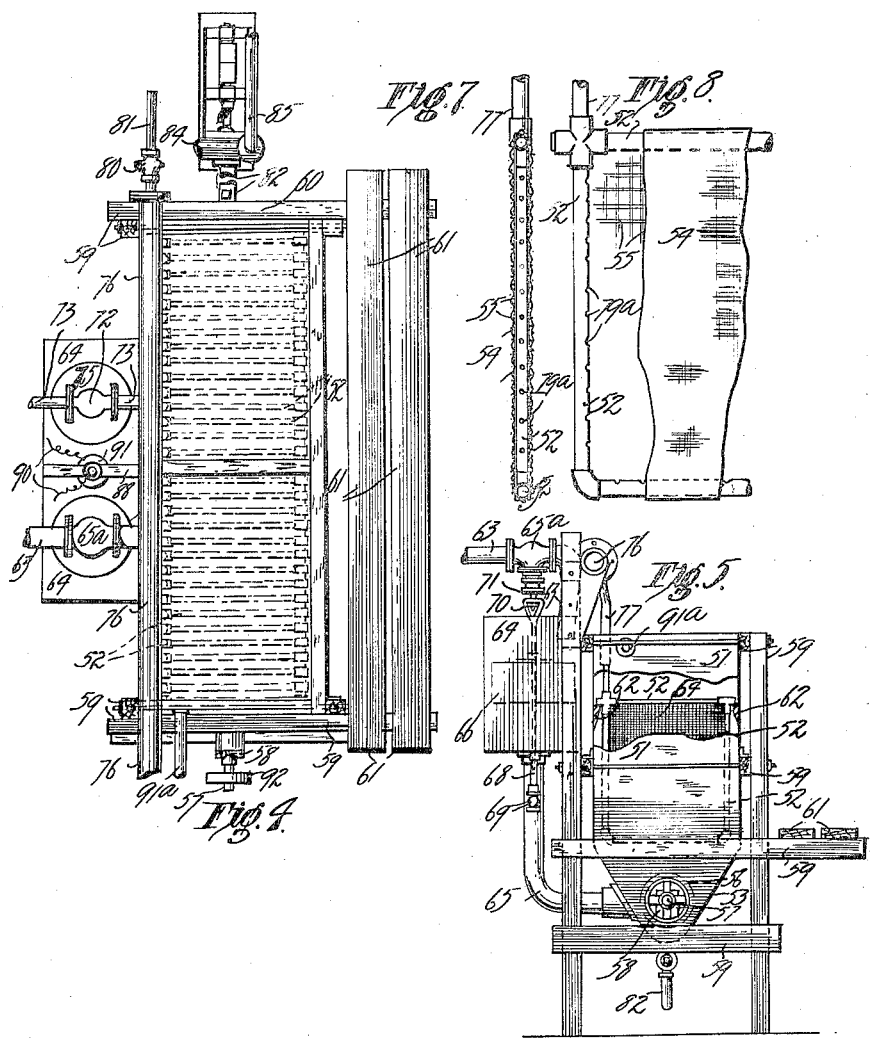

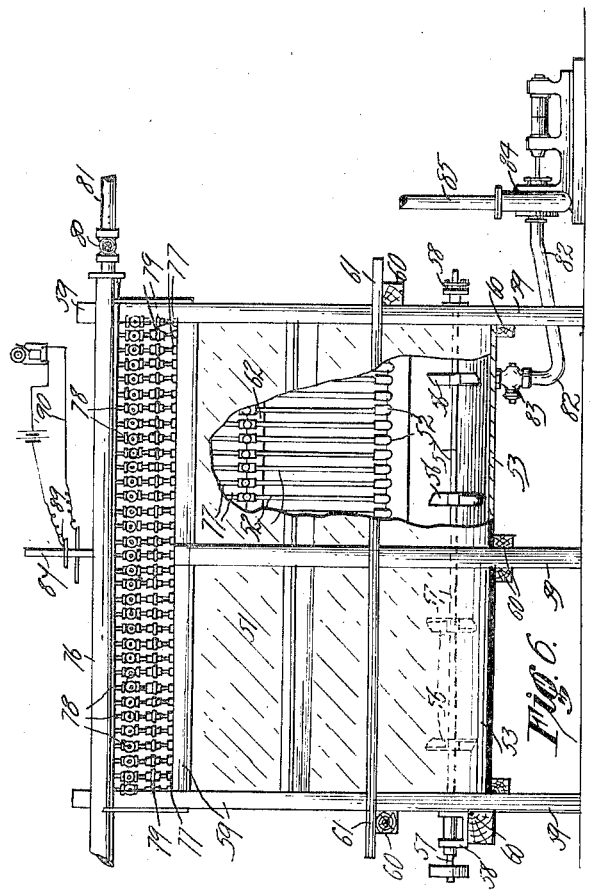

UNITED STATES PATENT OFFICE.

KARL BYRON MOORE, OF SEYMOUR CAMP, VICTORIA, AND HERBERT RICHARD EDMANDS, OF YOUANME, WESTERN AUSTRALIA, AUSTRALIA.

PROCESS OF AND APPARATUS FOR PRECIPITATING AND RECOVERING PRECIOUS METALS FROM THEIR SOLUTIONS.

1,368,520.  Specification of Letters Patent.  Patented Feb. 15, 1921.

Application filed September 21, 1917. Serial No. 192,549.

*To all whom it may concern:*

Be it known that we, KARL BYRON MOORE, a member of the Australian Imperial Forces, and HERBERT RICHARD EDMANDS, both citizens of the Commonwealth of Australia, whose post-office addresses are Seymour Camp, in the State of Victoria and said Commonwealth, and Youanmi Gold Mines Ltd., Youanme, State of Western Australia and said Commonwealth, respectively, have invented Processes of and Apparatus for Precipitating and Recovering Precious Metals from Their Solutions, of which the following is a specification, reference being had therein to the accompanying drawings.

This invention relates to a process of and apparatus for precipitating precious metals from their solutions and wherein finely ground charcoal is used as the precipitant.

Charcoal precipitation of metal bearing solutions is well known, but the hitherto existing processes have been open to objection, in that, the amount of space required was excessive, the precipitation was not sufficiently perfect to allow of universal usage; and the cleaning up operations were cumbersome owing to the very large amount of charcoal it was necessary to burn off.

The usual process hitherto employed consisted in crushing the charcoal to pea size, or larger, then to place the same in tubs or boxes similar in principle to zinc shaving extractors, through which the solution slowly percolated and often with a final compartment carrying zinc shavings.

This invention has been devised in order to provide a process which is cheap, simple and effective, and embodying means for the precipitation of precious metals from their solutions with finely ground charcoal, and subsequently removing the gold bearing charcoal for further treatment.

The essential features embodied in the process are as follows:—

1. The use of charcoal that has been ground to a finely divided state, the charcoal having been preferably ground to a point beyond which no further benefit is derived.

2. Using freshly prepared charcoal resulting from hot ashes of wood fuel dropped into water, then preferably washing the same to free from ash, and then wet grinding to a sufficient degree of fineness, the resulting product forming a highly efficient precipitant. Fine grinding of the charcoal is very beneficial and it must be carried beyond anything measurable by screen tests, but there would appear to be a point beyond which it is inadvisable to proceed. This point can best be determined by precipitation tests or perhaps by noticing the color of an emulsion of a known weight of charcoal in distilled water, or in practice it may be arrived at by the time allowed for crushing with a given weight of balls.

3. Effecting the precipitation by filtration through cakes of pulverized charcoal in extractors designed to form cakes of even permeability.

4. Conducting the precipitation in two or more stages thus insuring low tail values and a maximum amount of gold deposit on a given weight of charcoal.

5. Arranging the flow of the solution and the charcoal in opposite directions.

6. Before pumping the solution away from the plant passing the same through fresh charcoal in the second or third stage extractor to allow of the precipitation of a maximum amount of gold from the solution.

7. The retaining of the charcoal under working conditions for a maximum period by the interchange of the flow of the solution from one extractor to the other, so that one extractor may be either the first, second or third stage extractor according to the manipulation of the valves controlling the flow of the solution.

8. It being essential that extractors be employed designed to form cakes of even permeability, a description of one construction has been inserted herein and in the accompanying drawings to more clearly describe and illustrate the carrying of the invention into practical effect.

In order that the invention may be more readily understood it will now be described with reference to the accompanying drawings in which—

Figure 1 is a diagrammatic view of a two stage precipitation plant embodied in the invention.

Fig. 2 is a diagrammatic view of a modified arrangement of the plant.

Fig. 3 is a diagrammatic view of the process applied in three stages.

Fig. 4 is a view in plan of the preferred form of extractor embodied in this invention.

Figs. 5 and 6 are views in end and front elevations respectively of the extractor illustrated in Fig. 4.

Fig. 7 is a view in section, and

Fig. 8 is a view in side elevation of the preferred form of filter frames embodied in the extractors.

In carrying the invention into practical effect, a basket of wire screening rests in a trough filled with water. The quenched charcoal is fed into the basket and the basket tossed up and down until the ash is washed off.

The grinding is effected in a horizontal cylinder containing steel balls or flint stones avoiding an excess of water, the charcoal being ground until a sufficient fineness is obtained i. e. a degree of fineness such as hereinbefore specified.

The charcoal is run out of the cylinder to a receptacle and from thence is pumped to the extractors the number of extractors employed being dependent upon the quantity of solution to be precipitated.

The preferred form of extractor employed consists of a filter unit giving an evenly permeable cake with the minimum chance of channeling, the preferred form of extractor being shown in Figs. 4 to 8 of the accompanying drawings.

In the plant illustrated diagrammatically in Fig. 1, the gold solution flows from the storage tank through pipe 3 into and through the first extractor 1 and thence through a pipe 13 to a vacuum pump 4 attached to the first extractor, said pump delivering the tail solution through the pipes 9, 10 to a second storage tank 5, from which it flows through the pipe 11 into and through the second extractor 2. The second extractor vacuum pump 6 delivers the second or final tails where required through the pipe 7, the plant being provided with valves 8 controlling the flow of solution, and means for operating the pumps and other moving parts of the plant being also embodied in the invention.

The operation continues until the precipitating power of the charcoal in the first extractor 1 is sufficiently exhausted, the charcoal being then removed from the extractor 1, and a fresh charge of charcoal fed therein, and by altering the various valves the flow of solution is reversed.

The second extractor 2 now takes the gold solution, the first extractor 1 taking the tail solution from the second extractor, the operation being such that the pump 6 sends the tail solution through the pipes 12, 10 to the tank 5, from which the tails are delivered to the first extractor 1 through the pipe 11, and from the extractor 1 by the pipe 13 through the pump 4 and pipes 14 and 7, the tails being then delivered to where required. When the charcoal in the second extractor 2 is fully loaded with gold it in turn is discharged and refilled with fresh charcoal, the flow of solution being again reversed and the cycle is continued.

To remove the spent charcoal from the extractors the vacuum is released, the cakes dropped and emulsified by the propellers of the extractor, and the pulp is then run by gravity into a sunken monte-jus connected to a clean up filter press which gives cakes of charcoal sufficiently dry to feed direct into braziers for burning. After burning until combustion is complete the ash is removed and smelted to recover the contained bullion.

In a modification of the invention according to Fig. 2 the ground charcoal is agitated with the gold solution preparatory to filtration, and the first tails are again agitated with charcoal before final filtration.

Four agitators 15, 16, 17, 18 are provided and gold solution enters either of the first stage agitators 15, 16, through the pipe 19 and ground charcoal being added, agitation is given after which the charcoal bearing solution flows through the first extractor 1, whence filtrate (1st stage tails or 2nd stage heads) is pumped to one of the second stage agitators 17, 18, the vacuum pump 4 delivering the solution through the pipes 20, 21 to either one of the second stage agitators. Meanwhile, the other first stage agitator is being filled with gold solution and agitated with ground charcoal.

The second stage heads (in the second stage agitator) are now treated with ground charcoal, agitated and caused to flow through the pipe 22 to the second extractor 2, the filtrate (final tails) being pumped by the pump 6 through the pipes 23, 24 to where required.

The operation continues until the precipitating power of the charcoal that has accumulated on the extractor frames has become sufficiently exhausted, when the charcoal is removed from the extractor and fed to the monte-jus, and to a filter press, being then burnt and the gold recovered as above described. The second extractor 2 has its charcoal removed, but this is fed into the first stage agitators as required.

Thus the first stage agitators 15, 16 are always fed with charcoal that has effected a second stage precipitation and is only slightly charged with gold, while fresh charcoal only is used in the second stage agitators 17, 18, the consumption being thus halved.

It is desirable that the filter or extractor employed be of a type that allows the cakes to be dropped and reformed at intervals.

The essence of the invention being the precipitation by charcoal in a plurality of stages, a three stage precipitation is illustrated in Fig. 3.

In this arrangement the gold solution is contained in the tank 25, and flows through the pipe 26 to the extractor 27, and thence through the pipe 28 to the pump 29 which pumps it through the pipe 30 into the tank 31.

From the tank 31 the solution flows through the pipes 32, 33 to the second extractor 34 being filtered through the extractor 34, and pumped by the pump 35, through the pipes 36, 37, to the third tank 38.

The solution then flows from the third tank 38 through the pipe 39 to the third extractor 40 being filtered therethrough, and being then drawn through the pipe 41, by the pump 42, and delivered by the pipe 43 to where required.

During this operation charcoal is fed into the extractor 40 and when the gold content of the solution of this extractor rises in value above a certain point, the charcoal is transferred to the extractor 34 fresh charcoal being supplied to the extractor 40.

As the gold content in the solution again rises the charcoal from extractor 34 is transferred to extractor 27, and the charcoal from extractor 40 is transferred to extractor 34, fresh charcoal being again supplied to extractor 40.

By this means the cnarcoal is passed from extractor 40 to extractor 27, while the flow of the solution is in an opposite direction, being from the extractor 27, to extractor 40 in the manner above described.

It will be obvious that the charcoal need not be actually transferred from one extractor to another, as by the manipulation of the valves 43$^a$, fitted in the pipe connections, the flow of the solution is so controlled that any one extractor may either be the first, second, or third stage extractor, it being essential, however, that the last stage extractor contains fresh charcoal to allow of the precipitation of a maximum amount of gold from the solution.

The precipitation is preferably effected by filtration through a thin layer of ground charcoal, without the agitation of the charcoal with the solution, and in the manner described with reference to Figs. 1 and 3.

The preferred construction of extractor employed is illustrated in Figs. 4, 5, 6, 7 and 8.

These extractors comprise a tank 51 containing filter leaves, the tank being of any convenient shape or size but is preferably formed with a V-shaped bottom 53.

Arranged within the tank 51 and below the level of the solution are filter frames 52 arranged vertically and preferably constructed of iron piping, jointed, as illustrated. These filter frames 52 are covered with a filtering medium 54, such as duck, (the two surfaces of which are kept apart by the wire screening 55), cocoa matting or other suitable material, that allows of the escape of the filtrate into the piping forming the frame 52, an outer cover of calico being also used which greatly prolongs the life of the filter cloth.

The filter frames 52 are supported within the tank 51 by the brackets or beams 62.

Means of agitation are provided by propellers 56 on a horizontal shaft 57 under the filter leaves 52. The propellers 56 have a thrust in different directions, thus obtaining better agitation and neutralizing the thrust on the bearings 58 at each end of the frame.

This forms an efficient means of keeping the precipitant in suspension while the cake is forming, insuring a cake on the filter leaves of even permeability.

The tank 51 is mounted on a suitable supporting frame 59 with suitable cross beams 60 and an observation and working platform 61.

An inlet pipe 63 for the solution to be precipitated is led into a tank 64 alongside the V-shaped tank 51, and connected therewith preferably near the bottom of the latter by the pipe 65.

The flow of solution into the tanks 51, and 64 is regulated by a valve 65$^a$ in the inlet pipe 63 controlled by a float 66 working in the tank 64 alongside the V-shaped tank 51.

This float 66 is capable of adjustment along a rod 67, the upper end 70 of which is connected to the stem 71 of the valve 65$^a$.

The lower end of the rod 67 slides in a guide tube 68 preferably fitted with a valve 69.

The tank 64 is fitted with another float 75 provided for the purpose of controlling the valve 72 of the return solution pipe 73 leading from the tank 51 as illustrated in Fig. 4.

The suction pipe 76 leads from the respective vacuum pumps 29, 35, 42 (Fig. 3) and through suitable valves and pipe connections communicates with the filter leaves 52 above described arranged vertically within the tank 51.

Each filter frame 52 is preferably connected to the suction pipe 76 by a hose 77, valve 78, union 79 and nipple, while the inner surfaces of the said frames 52 are perforated as at 79$^a$ to provide for the passage of the solution. A valve 80 and vacuum pipe 81 connect the suction pipe 26 and lead to suitable cleaning up appliances.

A discharge pipe 82 is fitted to the bottom 53 of the tank 51 and is provided with a suitable stop cock 83 which may be locked, if desired, and this pipe 82 may conveniently be connected with a centrifugal pump 84 which at the conclusion of the precipitation delivers its precipitated material after emulsification through the delivery pipe 85 into a vat, tank or monte-jus 96 (Fig. 3)

from which it may be pumped to the cleaning up appliances.

A float 91 of suitable construction carried by a rod 87 working within the guide bar 88 and fitted with electrical contacts 89 for the purposes of closing a bell circuit is carried by the tank 64 for the purpose of indicating when the solution level varies over certain limits.

These contacts 89 connect the line wires of a bell circuit 90 as illustrated diagrammatically in Fig. 6.

An emergency overflow pipe 91ª is fitted to the tank 51. The propeller shaft 57 is fitted with a driving pulley 92 and the moving parts are driven from any suitable source of motive power.

In the operation of the process the charcoal obtained from the ash-pit of any wood burning furnace is washed. This is preferably effected by placing the charcoal in a basket of wire screening fitted with handles and lugs and resting in a trough filled with water, the basket being slung on a lever swiveled on a post and is tossed up and down till all the ash is washed off.

The grinding of the charcoal is then effected in a cast iron cylinder containing steel balls. Damp charcoal, as it comes from the washer, is fed in with about one third of its weight of water, and the grinding is continued until the charcoal is ground sufficiently fine, the step occupying approximately eighteen hours.

The charcoal pulp in the required quantity is then fed to the extractors by means of a centrifugal pump.

The extractors each contain preferably twenty-one filter frames of approximately 2 feet 3 inches by 2 feet 9 inches and as an instance of the amount of charcoal required 300 pounds (dry weight) of charcoal would be used in an extractor of this capacity.

The filter leaves are suspended in the unit and the solution is run on until they are well covered. The charcoal pulp is then pumped in and the propellers are started and allowed to run during the whole operation.

After a few minutes vacuum is created and solution is run in, a cake being quickly formed on each leaf, and in about twenty minutes the solution is practically clear.

This condition is allowed to exist for a period of 24 hours, when the vacuum is released, the charcoal reëmulsified, and the cakes reformed by restoring the vacuum.

Under ordinary conditions the 300 pounds of charcoal would remain for nine days, and in a three stage precipitation, the extractor in which the fresh charcoal is contained is the third or final treatment unit for the first three days.

It then becomes the second unit for the second three days, and the first unit for the last three days at the end of which it is discharged and refilled, the arrangement being such that the flow of the solution and charcoal is in opposite directions, very little precipitation being effected in the first stage, but undesirable substances are removed, leaving the solution in good condition for the second stage extractor, which in turn performs the same function for the third and final stage extractor, wherein fresh charcoal is always used in order to obtain a maximum precipitation.

The next step is the burning of the charcoal. When it is sufficiently charged with gold and its precipitating energy is practically exhausted, the vacuum is released, the charcoal emulsified, and the pulp run by gravity through the pipes 95 into a small sunken sump such as 96 (Fig. 3), or is pumped by the pump 84 past the valve 83 through the pipes 82 and 85 (Fig. 7) into the sump or monte-jus 96 (Fig. 3).

From this sump 96 the pump 97 forces the loaded charcoal emulsion into a clean up press 98, the loaded charcoal being then washed, and compressed air turned on, to remove so much moisture as possible, and the cakes from the press 98 without any further drying are ready for burning in the chamber 99. The washing operation dissolves a considerable amount of $CaSO_4$ and other salts, thus removing the quantity of ash to be smelted.

The burning is preferably conducted in simple braziers of stout wire screening which allow of slow and perfect combustion, the operation being conducted without agitation.

When the burning is finished the ash is smelted in a tilt furnace 100, graphite pots being preferably used, the slag is ground and amalgamated, and the matte, if present, is readily cleaned.

By the charcoal precipitation in a plurality of stages as above described wherein the flow of solution is interchanged from one extractor to the other, the charcoal is retained under working conditions a much longer period than is possible with single stage precipitation, and by this means the full precipitating energy of the charcoal is utilized so allowing of economical working.

What we claim as our invention and desire to secure by Letters Patent is—

1. A continuous process for the precipitation of precious metals from their solutions, consisting in feeding finely ground charcoal into and through a series of extractor units; passing the metal-bearing solution through the extractors in the opposite direction and in the reverse order so as to effect precipitation in all the extractors; discharging the metal-loaded charcoal pulp; and feeding fresh charcoal into the extractor at the feeding end of the series.

2. In apparatus for the precipitation and recovery of precious metals from their solutions, the combination of a series of extractor units having means for forming cakes of charcoal therein; means for feeding the charcoal to the extractor units; a set of storage tanks; pipe connections for feeding the metal-bearing solution in stages from the storage tanks to the units; vacuum pumps in the pipe connections between the extractors; and valves in said pipe connections for changing the flow of the solution from one extractor to another.

3. In apparatus of the character described, the combination of a plurality of storage tanks; a set of extractor units; and pipe connections between the storage tanks and the extractor tanks for feeding the liquid containing the values to be precipitated in such a way that the fresh solution will pass through the extractors which have already taken up considerable of the values; vacuum pumps in the pipe connections; and valves in said pipe connections for interchanging the flow of the solution from one extractor to another.

4. In apparatus for the precipitation of precious metals from their solutions, the combination of a plurality of extractor units; means for passing the solution from the first extractor to the second and thence to the third extractor; means for feeding charcoal into the third extractor to effect precipitation therein until the tails rise; means for transferring the charcoal therefrom to the second stage extractor; means for transferring the charcoal from the second stage extractor to the first stage extractor; and means for feeding fresh charcoal to the third stage extractor, and, as tails again rise, for transferring the charcoal from the second stage extractor to the first stage extractor.

In witness whereof we affix our signatures in the presence of two witnesses.

KARL BYRON MOORE.
        HERBERT RICHARD EDMANDS.

Witnesses as to the signature of Karl Byron Moore:
    SIDNEY HENDLEY,
    ANNA EDWARDS.

Witnesses as to the signature of Herbert Richard Edmands:
    L. TURNBULL,
    S. G. FLEMING.